United States Patent [19]
Radtchenko

[11] Patent Number: 5,142,810
[45] Date of Patent: * Sep. 1, 1992

[54] ARTIFICIAL LURE

[76] Inventor: Konstantin Radtchenko, 235 Manhattan Ave., Jersey City, N.J. 07307

[*] Notice: The portion of the term of this patent subsequent to Sep. 18, 2007 has been disclaimed.

[21] Appl. No.: 562,805

[22] Filed: Aug. 6, 1990

Related U.S. Application Data

[62] Division of Ser. No. 316,808, Feb. 28, 1989, Pat. No. 4,956,933.

[51] Int. Cl.⁵ .............................................. A01K 85/00
[52] U.S. Cl. .................... 43/42.04; 43/42.08; 43/42.36; 43/42.41
[58] Field of Search ................ 43/42.02, 42.04, 42.05, 43/42.36, 42.08

[56] References Cited

U.S. PATENT DOCUMENTS

| | | | |
|---|---|---|---|
| 2,497,473 | 2/1950 | Slepica | 43/42.04 |
| 2,500,477 | 3/1950 | Walker | 43/42.44 |
| 3,494,062 | 2/1970 | Gardner | 43/42.04 |
| 3,902,265 | 9/1975 | Pond | 43/42.05 |
| 4,796,375 | 1/1989 | Wilson | 43/42.36 X |
| 4,956,933 | 9/1990 | Radtchenko | 43/42.49 X |

Primary Examiner—Richard K. Seidel
Assistant Examiner—Patty E. Hong
Attorney, Agent, or Firm—Ilya Zborovsky

[57] ABSTRACT

An artificial lure has a main body, a rod with a hook, and a preserve element located between the main body and the rod and formed so that it does not change during throwing the lure in manipulation in water, but then in response to setting a hook by a fisherman allows movement of the rod with the hook relative to the main body to improve engagement of the hook in the fish's mouth, and the preserve element can be used repeatedly.

6 Claims, 8 Drawing Sheets

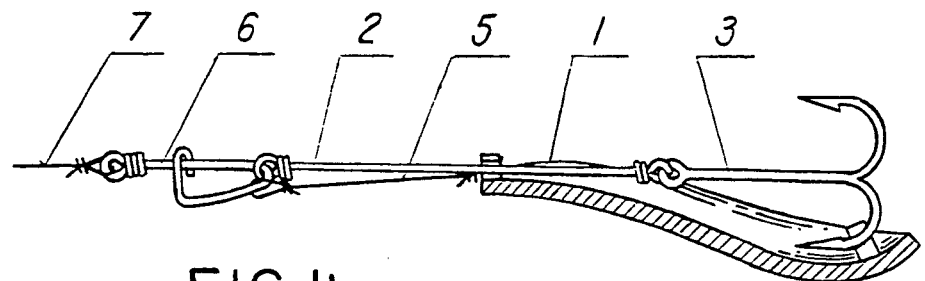
FIG.1b
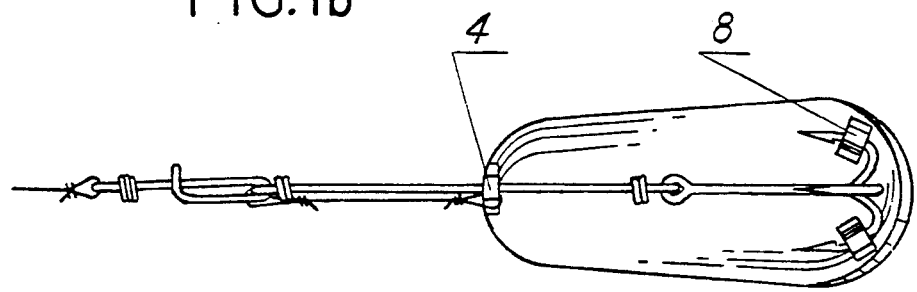
FIG.1a
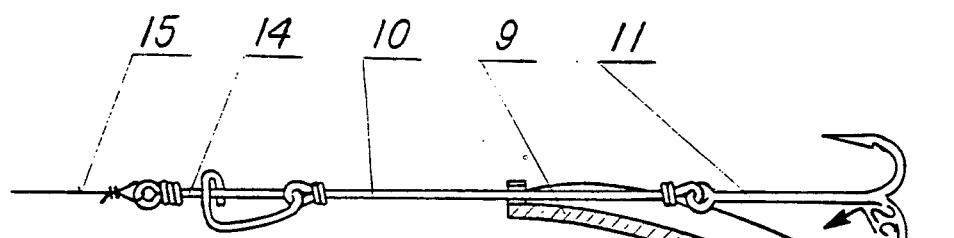
FIG.2b
FIG.2c
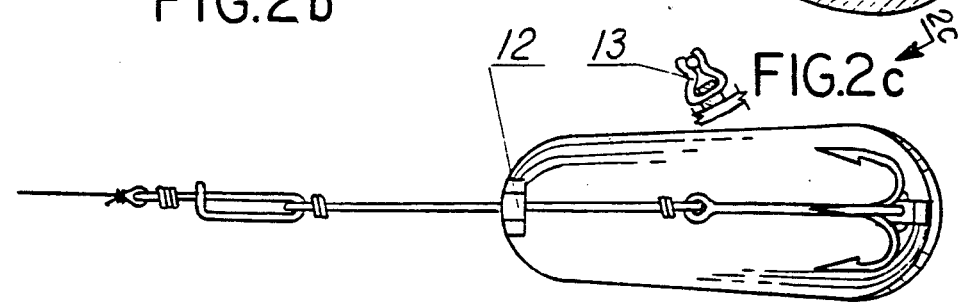
FIG.2a

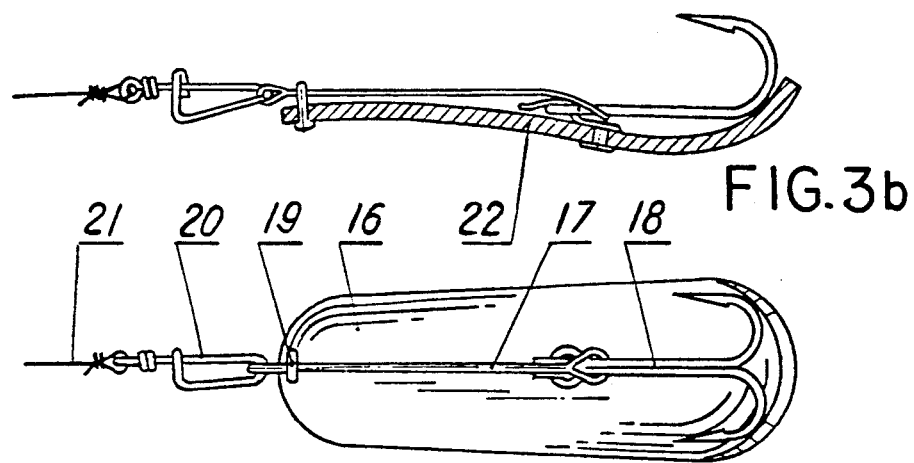
FIG. 3b
FIG. 3a
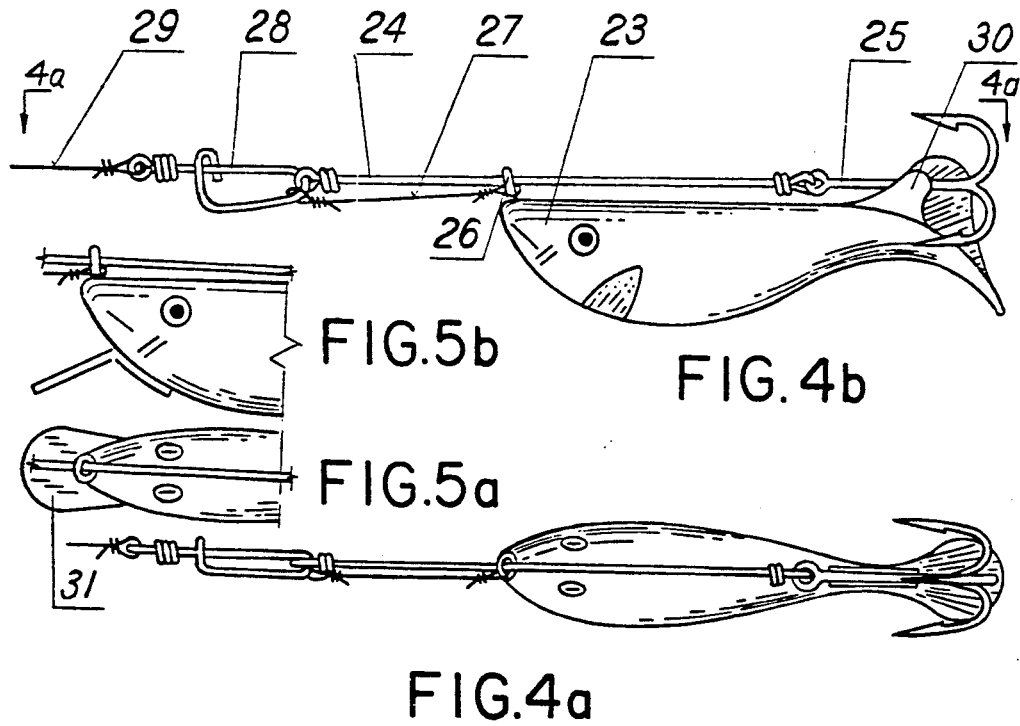
FIG. 5b
FIG. 4b
FIG. 5a
FIG. 4a

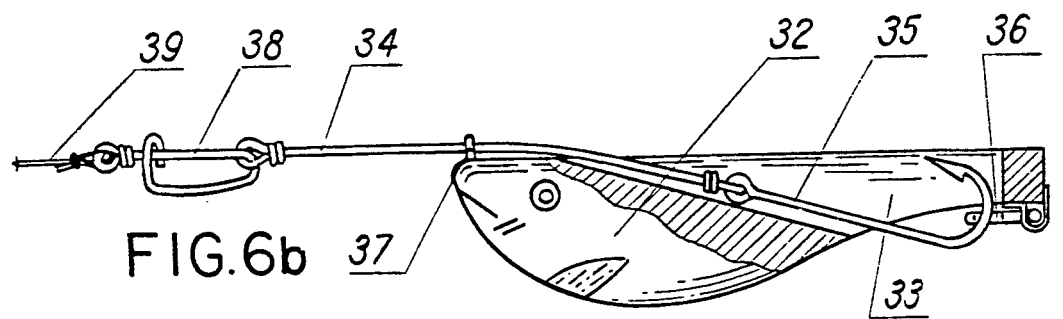
FIG. 6b
FIG. 6a
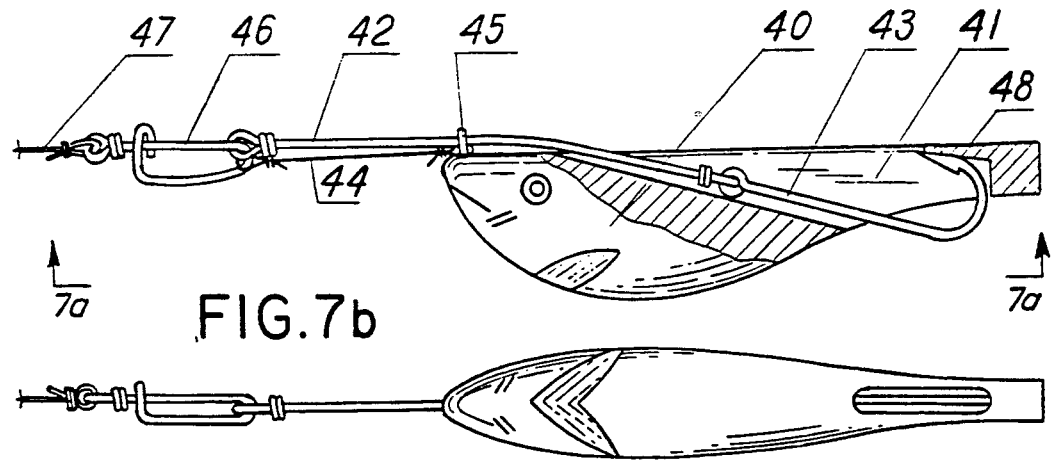
FIG. 7b
FIG. 7a

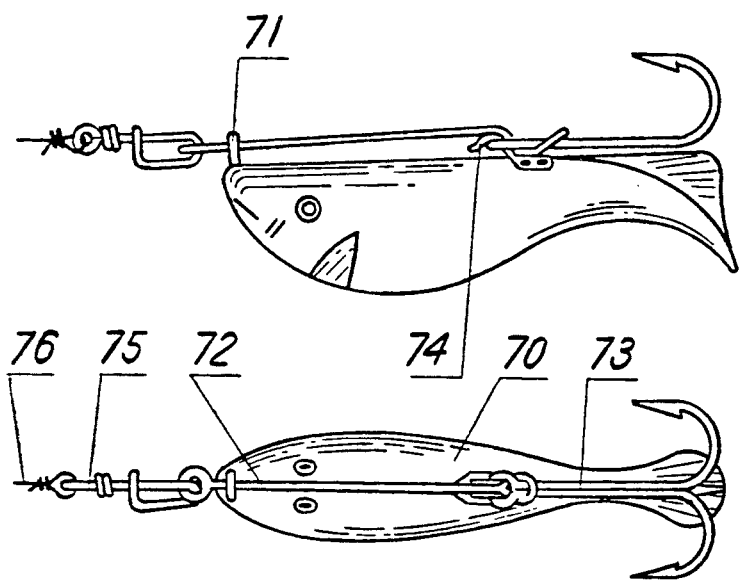
FIG.10b
FIG.10a
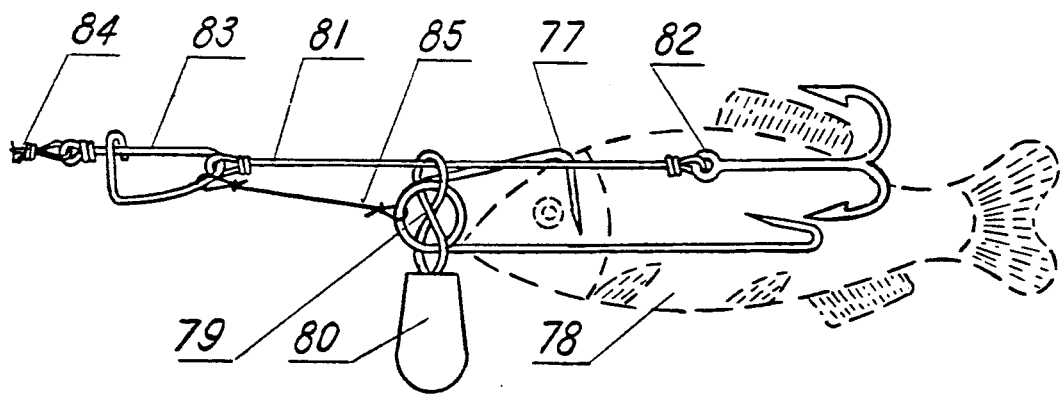
FIG.11

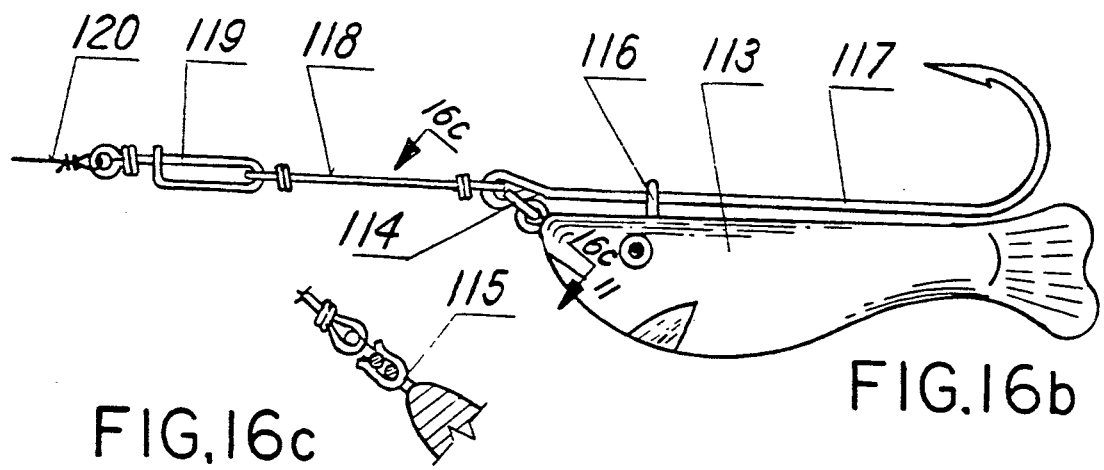
FIG.16b
FIG.16c
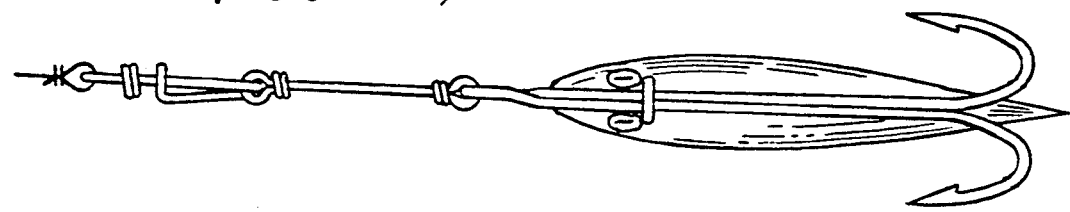
FIG.16a

ARTIFICIAL LURE

CROSS-REFERENCE TO A RELATED APPLICATION

This application is a division of application Ser. No. 316,808 filed on Feb. 28, 1989 now U.S. Pat. No. 4,956,933.

BACKGROUND OF THE INVENTION

The present invention relates to an artificial lure, and the like.

Artificial lures, plugs and similar devices are widely used to catch fish and have a great variety of constructions. In the known devices of this type the hooks are connected permanently with the lures and plugs. This to some extent limits the efficiency of fishing. It is therefore advisable to propose artificial lures and similar devices for use for example with dead fish as bait, which increases the fishing take.

SUMMARY OF THE INVENTION

Accordingly, it is an object of the present invention to provide a new artificial lure and the like, which allows increase of the fishing take.

In keeping with these objects and with others which will become apparent hereinafter, one feature of the present invention resides, briefly stated, in an artificial lure and the like, in which a body of the lure is subdivided into two parts, namely a main lure part and a rod part wherein the rod part is connected permanently with a fishing line, but the main lure part is connected with the fishing line or the rod through a preserve element which under the action of setting is not destroyed and can be utilized for a multiple use, however, at the same time has a supply of movement relative to the main lure part.

When a fish has taken the artificial lure in accordance with the present invention, it is necessary to strike the fishing rod with a predetermined force which disconnects the preserve element. After the disconnection of the preserve element, the rod with the hook obtains the possibility to move relative to the main lure body in direction toward the fisherman, and the hook catches the fish mouth. Kinetic energy consumed for disconnecting the preserve element is transferred to the rod with the hook and as a result the hook reliably threads the fish mouth.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 1a and 1b are views showing an artificial lure and a rod with a hook connected by a disposable preserve element;

FIGS. 2a, 2b, 2c are views showing the lure and the rod with the hook connected by a preserve element for a multiple use;

FIGS. 3a and 3b are view showing a lure and a rod with a hook connected by a preserve element for one time use;

FIGS. 4a and 4b are views showing a plug and a rod with the hook connected by the preserve element for one time use;

FIGS. 5a and 5b are views showing a plug and a rod with a hook connected with the preserve element of one time use, which connects a forehead eye of a rod or an eye of a fishline with a blade;

FIGS. 6a and 6b are views showing a plug and a rod with a hook connected with a preserve element of a multiple use, wherein the hook is hidden in a cavity;

FIGS. 7a and 7b are views showing a plug and a rod with a hook connected with a disposable preserve element which connects a forehead eye of the rod and the eye of the plug and the hook is hidden in a cavity;

FIGS. 10a and 10b are views showing a plug and a rod with a hook connected by a preserve element of a multiple use formed as a spring plate which fixes the eye of the hook;

FIG. 11 is a view of a device for using the dead fish as a bait (or conserved fish) with a rod and a hook connected by a disposable preserve element;

FIGS. 16a, 16b, 16c are views showing a plug with a special double hook having an eye connected with a multiple use preserve element.

DESCRIPTION OF THE PREFERRED EMBODIMENTS

Figure 8B:
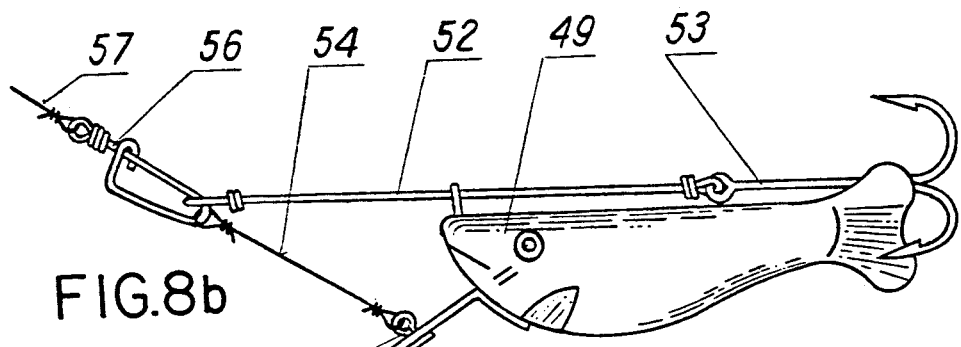
FIGS. 8a and 8b are views showing a plug with a blade and a rod with a hook connected with the preserve element of a one time use which connects the eye of the rod and the eye of the plug.

A lure in accordance with the present invention includes a lure main body and a thin rod with a hook which are connected with one another by a preserve element for one time use (destructible) and multiple time use (non-destructible).

FIG. 1 shows an artificial lure which has a lure main body 1, a rod 2 with a hook 3. The rod passes through an eye 4 provided on the main body. A preserve element 5 is connected with its one end to the eye 4 and with its another end to a front eye of the rod or with a buckle 6 connected with a fishline 7. The prongs of the hook can be temporarily fixed in fixing members 8 formed for example as rubber pieces with upper slot. This permits loose swinging of the hook, but at the same time does not permanently fix it to the body. The preserve element is disposable and is destroyed during strike after the hook has been bitten. Its length is selected so that it provides a sufficient supply of movement of the rod 2 with the hook 3 for efficient engagement of the fish mouth by the hooks.

The strength of the preserve element is selected so that:

during throwing of the lure with a spinning and manipulations with the bait in water it is not destroyed;

after the hook has bitten, it is destroyed during setting.

The preserve element can be formed as a fishline with a strength of 2 pounds, where the weight of the lure does not exceed 1.5 ounce. The throwing is performed by a spinning. With a flexible fishing rod the setting is performed with the fishing rod inclined forwardly so that it is aligned with the fish line.

During trolling the preserve element must not be destroyed during manipulation of the lure in water, and at the same time after fish has bitten the bait the setting must destroy the preserve element.

FIG. 2 shows a lure with a lure main body 9, a rod 10 with a hook 11, wherein the rod passes through an eye 12 on the main body. An open U-shaped eye 13 forms a multiple use preserve element and is arranged in the rear part of the main body. The position of the U-shaped eye 13 and the length of the hook 11 are selected to as to provide a sufficient supply of movement of the rod with the hook for efficient engagement of the fish mouth. The front eye of the rod 10 is connected with a buckle 14 attached to a fishline 15.

FIG. 3 shows a lure with a main body 16, a rod 17 with a hook 18, wherein the rod 17 passes through an eye 19 arranged in the main body. The rod 17 is connected with a buckle 20 attached to the fishline 21. The main body is provided with a multiple use preserve element 22 which has a special shape and fixes the eye of the hook in a predetermined position relative to the main body. The preserve element is composed of spring steel and permits movement of the rod with the hooks relative to the main body upon reaching of a certain force during a setting.

FIG. 4 shows a plug including a plug main body 23 resembling a natural fish, and a rod 24 with a hook 25. The rod 24 is connected with the main body through an eye 26 arranged in the body. A preserve element of one time use 27 is connected with a loop of the rod 24 or a buckle 28 on the one hand, and with a loop 26 in the main body on the other hand. The buckle 28 is connected with a fishline 29. The rear part of the main body has a fixing member 30 which holds a hook 25 immovably relative to the main body.

FIG. 5 shows a plug similar to the plug of FIG. 4. The difference is that the main body of the plug in FIG. 5 has a blade 31 for improved game of the plug in water.

FIG. 6 shows a plug with a plug main body 32 provided with an inner chamber 33, a rod 34 with a hook 35, wherein the hook is hidden in the chamber 33. A preserve element for multiple use is an open U-shaped spring eye 36. The rod 34 passes through the eye 37 located in the main body and is fixed to the buckle 38 connected with the fishline 39.

FIG. 7 shows a plug with a plug main body 40 having an inner chamber 41, a rod 42 with a hook 43. The preserve element of one time use 44 is connected with an eye 45 in the main body with a buckle 46 attached to the fishline 47. The rear side of the chamber 41 has a step 48 which fixes the position of the hook 43 in the chamber.

Figure 8A:
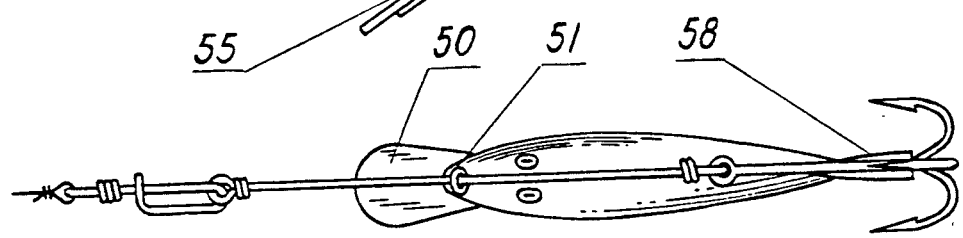

FIG. 8 shows a plug with a plug main body 49 with a blade 50 and an eye 51 for passing a rod 52 with a hook 53. A preserve element 54 of one time use is connected with the eye 55 mounted in the blade 50, and with the buckle 56 connected with the fishline 57. The main body has a fixing member which holds one of the hook prongs.

Figure 9B:
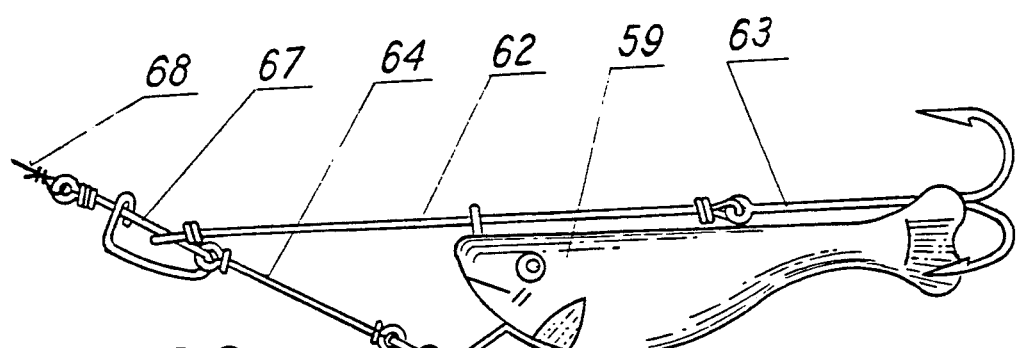
FIGS. 9a and 9b are views showing a lure and a rod with a hook connected by a preserve element of a multiple use, which connects the eye of the rod and the eye of the plug.
Figure 9A:
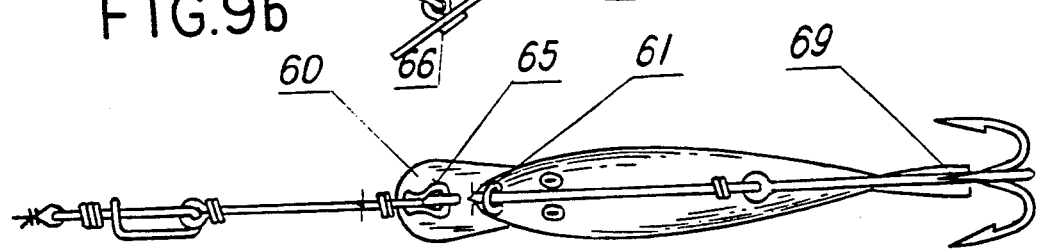

FIG. 9 shows a plug which has a plug main body 59 with a blade 60 and an eye 61 for passing a rod 62 with a hook 63. A preserve element of multiple use includes an additional rod 64 and an open U-shaped springy loop 65 connected with an eye 66 in the blade 60. The rod 62 is connected with a buckle 67 attached to a fishline 68. The main body 59 has a fixing member which holds one of the hook prongs.

FIG. 10 shows a plug with a plug main body 70 having an eye 71 for passing a rod 72 with the hook 73. The preserve element of multiple use 74 has a special shape and fixes the eye of the hook 73 in a predetermined position relative to the main body. The rod 72 is connected with the buckle 75 connected to a fishline 76.

FIG. 11 shows a device for fishing of fish or prey with dead fish as a bait. It has a wire device 77 for holding dead fish 78. The latter has a floating bladder and tends to turn upside down. To avoid this, the wire device is connected by a loop in the shape of numeral 8 with a weight 80. A rod 81 passes through the loop and has a hook 82. The hook is engaged with one prong under the fish skin. The rod 81 is connected with a buckle 83 attached to a fishline 84. The preserve element of one time use 85 is connected with a spring of the wire device 77 or the loop 79 on one hand, and with the buckle 83 or the front eye of the rod 81.

Figure 12B:
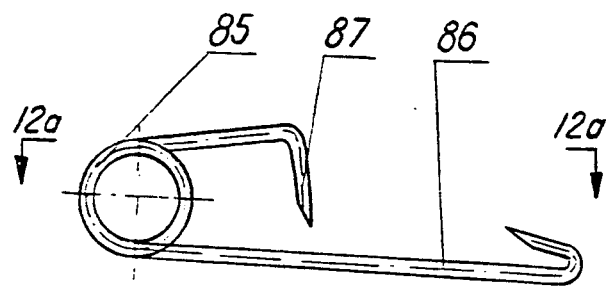
FIGS. 12a and 12b are views showing a wire device for mounting the dead fish.
Figure 12A:

FIG. 12 shows a wire device including a spring loop 85, a long prong 86 insertable through the mouth of dead fish into its interior, and a short prong insertable into bone structure of fish head.

Figure 13:
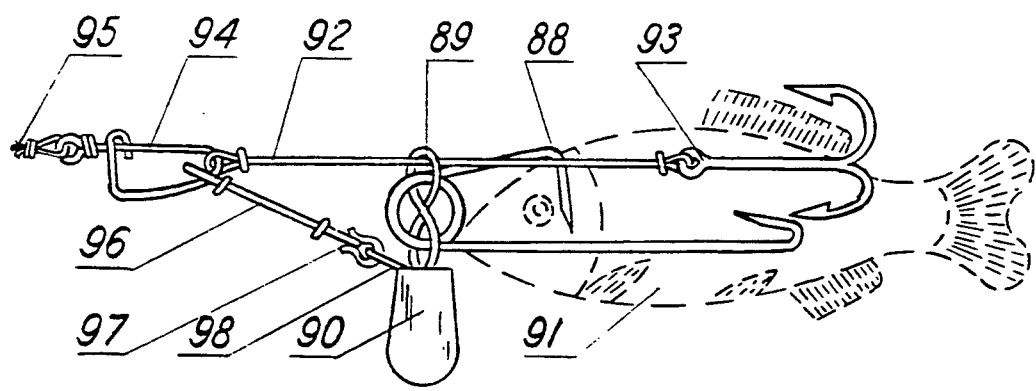
FIG. 13 is a view showing the device for using dead or conserved fish as a bait with a rod and a hook connected by a preserve element of multiple use formed as a open U-shaped spring eye.

FIG. 13 shows a device for fishing of fish or prey with the use of dead fish, which includes a wire device 88, a loop 89 connecting the wire device with a weight 90, dead fish 91, a rod 92 with a hook 93 connected with a buckle 94 which is attached to a fishline 95. The multiple use preserve element includes the rod additional 96 and an open U-shaped spring eye 97 connected to an eye 98. The latter is built in a weight 90.

Figure 14B:
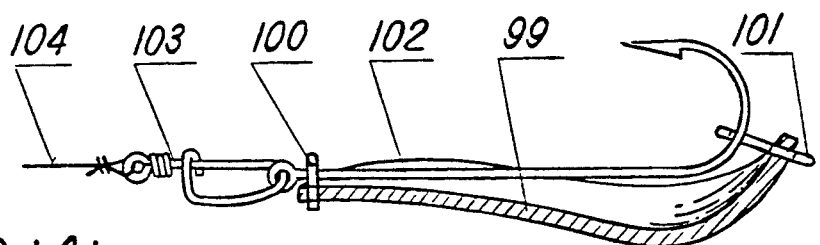
FIGS. 14a, 14b, 14c are views showing a lure with a special hook having an eye connected by a multiple use preserve element.
Figures 14A, 14C:
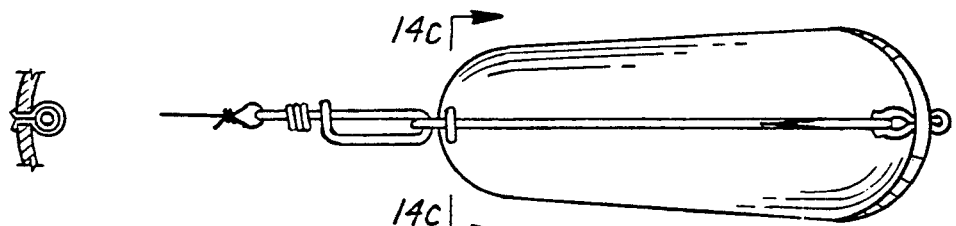

FIG. 14 shows a lure including a lure main body 99 with an eye 100 and a preserve element of multiple use 101. It is formed as an open U-shaped eye inserted into an opening in the main body. A hook 102 passes through an eye 100 and is connected with a buckle 103 attached to a fishline 104.

Figure 15B:
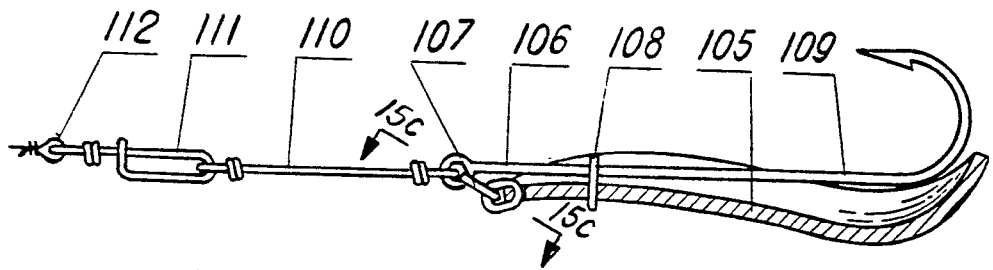
FIGS. 15a, 15b, 15c are views showing a lure with a special double hook having an eye connected with a multiple use preserve element.
Figures 15A, 15C:
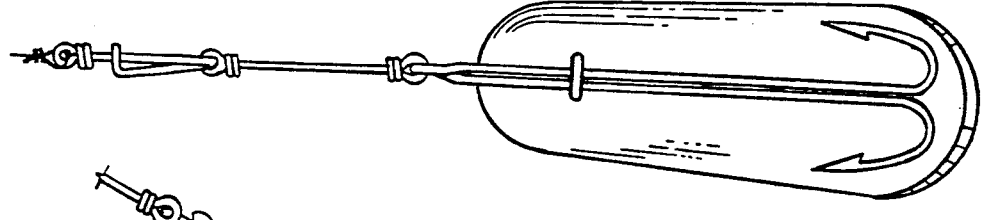

FIG. 15 shows a lure including a main lure body 105 with an eye 106 provided with a multiple use preserve element 107, and an eye 108 with a dobble hook 109. A rod 110 is connected with the hook eye 109 and with the buckle 111 attached to a fishline 112.

FIG. 16 shows a plug with a main plug body 113 provided with an eye 113. The preserve element of multiple use 114 is mounted in the eye 115. The plug further has an eye 116 and a double hook 117. A rod 118 is connected with the hook eye 117 and with a buckle 119 attached to a fishline 120. The construction shown in FIG. 16, as well as in FIG. 15 does not need an additional fixation of hook prongs, since the eye mounted on the main body and the preserve element sufficiently fix the hook relative to the bait.

The invention is not limited to the details shown since various modifications and structural changes are possible without departing in any way from the spirit of the present invention.

What is desired to be protected by Letters Patent is set forth in particular in the appended claims.

I claim:

1. An artificial lure comprising:
   a main body;
   a hook with a curved end and an eyelet end;
   at least one eye mounted on a first end of the exterior of said body;
   a springy eye mounted on a second end of the exterior of said body, removably engaging the curved end of said hook;
   a rod connected to the eyelet end of said hook, said rod with hook forming an assembly slidably threaded through said eye so as to be adjacent said body;
   wherein a hook setting motion releases said curved end of said hook from said springy eye providing said hook with a larger range of movement, including movement relative to said main body, to efficiently set said hook in a fish's mouth.

2. An artificial lure as defined in claim 1, wherein said springy eye is U-shaped.

3. An artificial lure as defined in claim 1, wherein said springy eye is a spring which fixes at least one portion of said rod with hook assembly.

4. An artificial lure as defined in claim 1, wherein said main body has a front end provided with a blade, said springy eye being located between said blade and a fishline which holds said lure.

5. An artificial lure as defined in claim 1, wherein said main body includes a wire structure for attaching dead fish as bait, a weight for stabilizing the dead fish, and a figure 8-shaped loop connecting said structure with said weight and surrounding portions of said structure.

6. An artificial lure as defined in claim 5, wherein said rod extends through said loop and is connectable with a fishline, said means being connected with said loop and said fishline.

* * * * *